Figure 1:
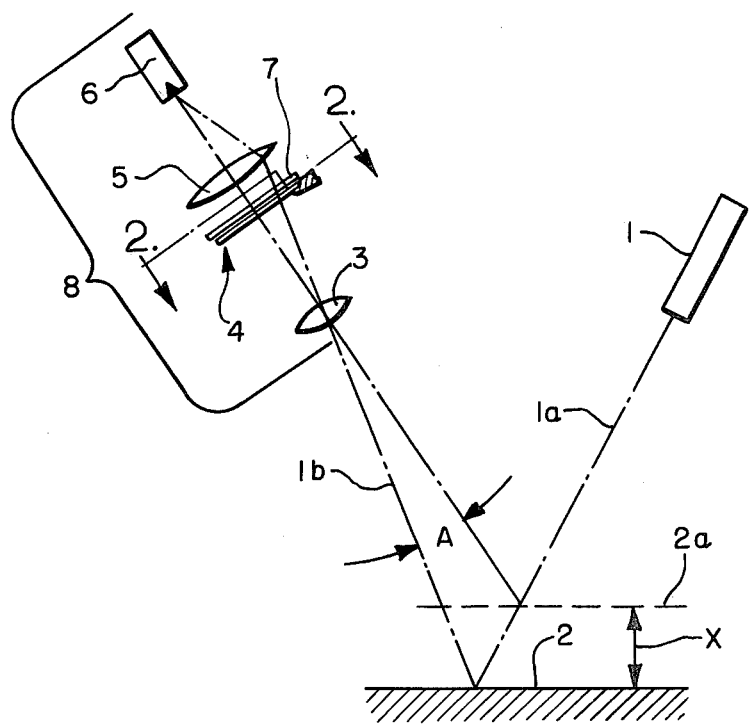

United States Patent [19]
Ernst

[11] 4,171,160
[45] Oct. 16, 1979

[54] DISTANCE MEASURING INSTRUMENT

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 844,715

[22] Filed: Oct. 25, 1977

[30] Foreign Application Priority Data

Nov. 3, 1976 [DE] Fed. Rep. of Germany ....... 2650422

[51] Int. Cl.² ............................ G01B 9/00; G01C 3/08
[52] U.S. Cl. ................................ 356/375; 250/237 R; 356/1
[58] Field of Search ...................... 356/1, 4, 120, 156; 250/237 R, 233

[56] References Cited

U.S. PATENT DOCUMENTS

| | | | |
|---|---|---|---|
| 2,524,807 | 10/1950 | Kallmann | 356/4 |
| 2,565,745 | 8/1951 | Skalka | 250/233 |
| 3,254,226 | 5/1966 | Bobula et al. | 250/223 R |
| 3,950,096 | 4/1976 | Aeschlimann et al. | 356/1 |

FOREIGN PATENT DOCUMENTS

| | | | |
|---|---|---|---|
| 1202012 | 9/1965 | Fed. Rep. of Germany | 356/156 |
| 2302512 | 9/1976 | France | 356/121 |

*Primary Examiner*—John K. Corbin
*Assistant Examiner*—Wm. H. Punter
*Attorney, Agent, or Firm*—Hume, Clement, Brinks, Willian & Olds, Ltd.

[57] ABSTRACT

A distance measuring instrument comprising a source of coherent light and a receiver is disclosed which may be used to measure the one dimensional position of an object surface. Coherent light is directed at a predetermined angle onto the object surface and the angle at which diffusely reflected light from this surface enters the receiver is measured. This entrance angle is measured with a photosensor and a movable aperture formed by the intersection of a fixedly mounted diaphragm and a movably mounted diaphragm. By measuring the position of the movably mounted diaphragm when the movable aperture is placed so as to allow reflected light to pass from the illuminated surface to the photosensor, the entrance angle of the reflected light and hence the position of the object is determined.

7 Claims, 2 Drawing Figures

DISTANCE MEASURING INSTRUMENT

This invention relates to a distance measuring instrument adapted for measuring the one dimensional position of an object. The instrument of this invention also may be used to measure the distance between two adequately reflecting borderline surfaces of a transparent body; that is to say, it may be used as a thickness measuring instrument. The instrument operates without physical contact with the object being measured, and can be designed to operate at a high measuring frequency of fifty readings per second, or more.

The prior art (German Publication Copies Nos. 2,157,813 and 2,448,219) discloses several distance measuring devices which use reflected light to measure the one dimensional position of an object. In such devices, a beam of incident coherent (laser) light is directed at various angles onto the object and the intensity of the reflected light striking a photosensor is measured in order to determine the angle of incidence at which the reflected light received by the photosensor is maximized. Once this angle of incidence is known, the position of the object may be determined. In one embodiment, the angle of incidence of the incident beam is made to vary sinusoidally so as to cause the incident beam to sweep over both a reference surface at a known distance and the object. The time interval between detection of reflected light from the reference surface and reflected light from the object is measured and the distance of the object determined.

Such an arrangement is relatively expensive to implement because it requires reference signals for the stabilization of the oscillatory system as well as a mirror oscillatory system for the deflection of the incident light beam. Moreover, the correlation between the measured time interval and the distance is not linear because of the sinusoidal nature of the oscillations, and precise result is obtainable only with corrections.

The present invention, therefore, is directed to an optical distance measuring instrument for measuring the one dimensional position of an object surface which does not require the use of either a physical reference surface or an oscillating beam of incident light. According to this invention, a beam of coherent light is directed at a fixed angle of incidence onto the object surface, and a receiver is used to measure the angle at which light is diffusely reflected from the object surface into the receiver. This entrance angle is measured with a movable aperture which is interposed between the photosensor and the object surface. By positioning the movable aperture so that the reflected light passes through the aperture onto the photosensor and then measuring the position of the aperture, the angle at which diffusely reflected light enters the receiver, and, therefore, the one dimensional position of the object surface are determined.

In a preferred embodiment of the instrument according to this invention, the movable aperture is formed by combining a rotating disc having an involutely-shaped slit diaphragm with a fixedly arranged slot diaphragm. The movable aperture is formed by the intersection of the slit diaphragm and the slot diaphragm, and as the disc rotates, the movable aperture moves along the slot diaphragm. The position of the movable aperture at which reflected light is transmitted from the object surface onto the photosensor may be measured by measuring the position of this rotating disc. The prior art discloses several suitable methods of measuring the angle of rotation of the disc. For example, the disc may be provided with an array of radial index marks and the disc position may then be determined by photoelectrically counting the index marks in a manner well known in the art.

Figure 2:
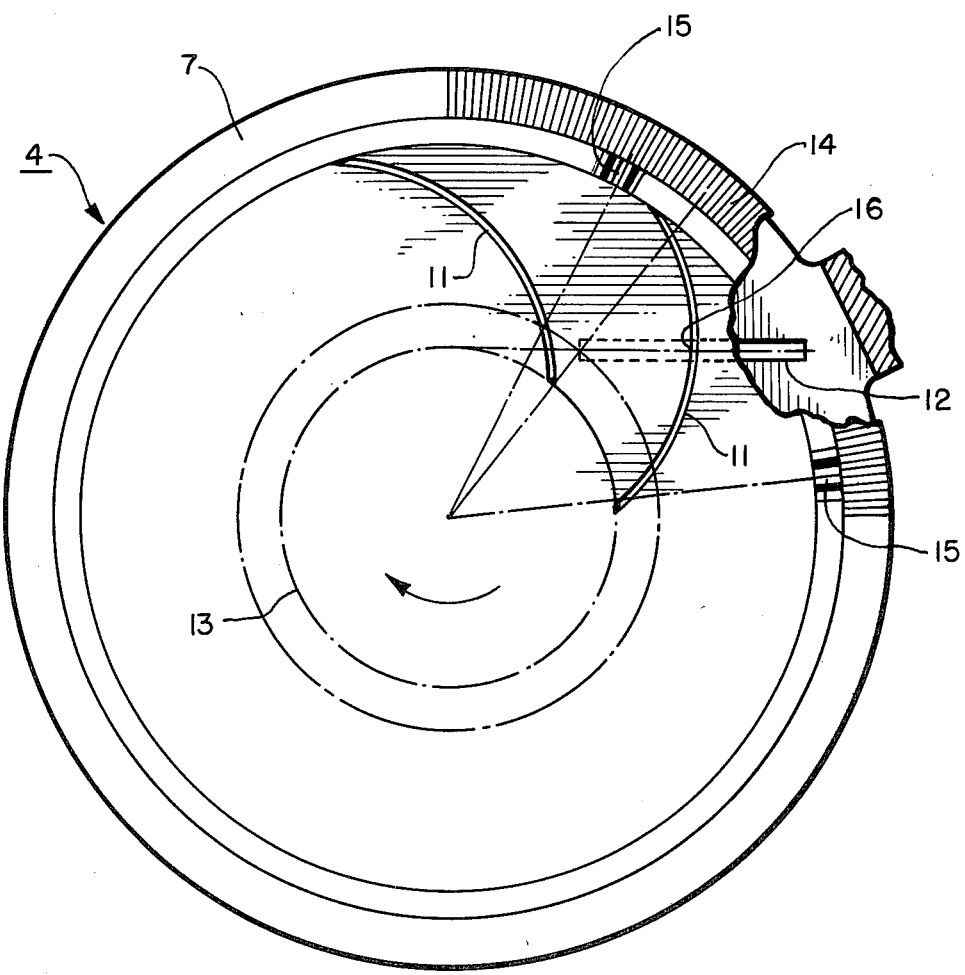

Additional features of the invention and attendant advantages are described in the description of the preferred embodiment which follows. This description should be read with reference to the accompanying drawings, in which:

FIG. 1 schematically depicts a preferred embodiment of the instrument according to this invention; and FIG. 2 schematically depicts the structure of the movable aperture assembly of the preferred embodiment of FIG. 1.

Referring now to FIG. 1, a laser 1 generates an incident coherent light beam 1a which is directed onto the object surface 2 whose one dimensional position with respect to reference surface 2a is to be measured. A portion of the incident light beam 1a is reflected diffusely by the object surface 2 into the receiver 8 which houses an objective lens 3, a movable aperture assembly 4, a condenser lens 5, and a photosensor 6. This reflected light is collected by the objective lens 3 onto the movable aperture assembly 4. Reflected light which is passed by the movable aperture assembly 4 is transmitted through the condenser lens 5 onto the photosensor 6 where it generates an electronic impulse.

As can be seen from FIG. 2, the movable aperture assembly 4 comprises an opaque disc 7 which is mounted to rotate under a stationary slot diaphragm 12. The opaque disc 7 is provided with a translucent curve 11, which serves to define a mobile slit diaphragm, and the intersection of the curve 11 and the slot diaphragm 12 forms the movable aperture 16. According to a particularly advantageous embodiment which, as will be explained below, makes possible a particularly simple evaluation of the distance X between the object surface 2 and the reference surface 2a, curve 11 is as involute which moves under the stationary slot diaphragm 12. The radial position of the movable aperture 16 formed by the intersection of the involute and the stationary diaphragm is a function of the angle of rotation of the disc 7. The curvature of that portion of the involute which forms the movable aperture is negligible if the inner part of the involute with the largest curvature is not used for the formation of the aperture. In the preferred embodiment, the stationary slot diaphragm 12 is arranged tangentially to the basic circle 13 of the involute.

The angle A between the optical axis of the receiver 8 and the reflected light beam 1b is a function of the distance X. The angular position of the disc 7 at which the movable aperture 16 is properly placed to transmit a portion of the reflected light 1b to the photosensor 6 is, in turn, a function of the angle A. Thus, by measuring the angular position of the disc 7 at which reflected light reaches the photosensor 6, the angle A and, therefore, the distance X may be determined. In this preferred embodiment, the angular position of the disc 7 is measured by photoelectrically counting regularly spaced, radial index marks 14 in a manner well known in the art. These index marks 14 are arrayed in a grid which extends around the perimeter of the disc 7. The electronic count is started when the disc 7 passes a reference position as indicated by the photoelectric sensing of the position of a reference mark 15 on the disc 7; the count is stopped when the photosensor 6 senses reflected light which has passed through the movable aperture 16. The number of index marks 14 counted during this period is a direct measure of the angular position of the disc 7 at the end of the count, and is a function of the angle A.

In the preferred embodiment, a plurality of translucent involute-shaped curves 11 are arranged on the opaque disc 7, as shown in FIG. 2. One reference mark 15 is associated with each curve 11. By using the multiple curves 11 on the disc 7, a high number of measuring cycles can be obtained per unit of time at an acceptable circumferential speed of the opaque disc 7. Furthermore, in a preferred embodiment not shown the rotating disc 7 is oriented parallel with the direction of the incident light beam 1a, because in that case, when involute-shaped slit diaphragms are used, the reference marks 15 may be positioned so that the measured angle of rotation of the disc 7 is directly proportional to the distance X.

The invention has been explained schematically by way of a concrete embodiment; however, the invention herein disclosed and claimed can be realized in various modifications. For example, the angular position of the disc 7 may be measured with a stabilized high-frequency generator which delivers a precisely timed rhythym impulse for measuring the interval of time between the detection of the reference mark 15 and the reflected light beam 1b. Moreover, within the framework of the invention, it is possible to utilize other curves in place of the involute curve for the curves 11 to define the mobile diaphragm. For example, a corrected involute may be used to equalize nonlinearities caused by nonparallelity between the incident light beam 1a and the disc 7. Of course, this correction also can be carried out using a digital or analog computer. Such changes and modifications can be made without departing from the scope of the present invention and without diminishing its attendant advantages. It is, therefore, intended that such changes and modifications be covered by the following claims.

I claim:

1. An apparatus for measuring a length corresponding to the one dimensional position of a surface, said apparatus comprising:
    means for directing an incident beam of coherent light at a substantially constant angle onto the surface;
    receiving means for detecting a portion of the beam after reflection from the surface;
    a rotatable disc positioned within the receiving means;
    at least one involutely shaped slit diaphragm defined by the disc;
    a fixedly-mounted slot diaphragm positioned within the receiving means adjacent the disc, the slot diaphragm being arranged tangentially to the basic circle of the involute which defines the slit diaphragm;
    a movable aperture defined by the intersection of the slit diaphragm and the slot diaphragm;
    a photosensor positioned in the receiving means to detect light which has passed through the movable aperture after being reflected from the surface; and
    position sensing means for sensing the position of the movable aperture to measure the entrance angle at which reflected light detected by the photosensor enters the receiving means and thereby to determine the length.

2. The apparatus of claim 1 wherein the rotatable disc is arranged substantially parallel to the incident beam.

3. The apparatus of claim 1 wherein a plurality of involutely shaped slit diaphragms are defined by the disc, each of said slit diaphragms having a common basic circle.

4. An apparatus for measuring the angular position of a light source comprising:
    a substantially linear, fixedly mounted diaphragm;
    a substantially involutely shaped mobile diaphragm mounted to rotate past the fixedly mounted diaphragm, said fixedly mounted diaphragm positioned tangentially to the basic circle of the involute which defines the mobile diaphragm to intersect the mobile diaphragm substantially transversely for a range of positions of said mobile diaphragm;
    a movable aperture defined by an intersection between the fixedly mounted and mobile diaphragms;
    means for focusing incoming light from the light source on the movable aperture;
    photosensor means for detecting focused incoming light which has passed through the movable aperture; and
    position sensing means for sensing the position of the movable aperture.

5. A precision measuring instrument for measuring the distance between a surface and a reference plane, said instrument comprising:
    means for directing an incident beam of coherent light onto the surface at a substantially constant angle of incidence;
    a rotatably mounted member which defines a substantially involutely shaped slit diaphragm;
    a substantially straight, fixedly mounted slot diaphragm positioned adjacent the rotatably mounted member substantially parallel to a tangent to the basic circle of the involute of the slit diaphragm to intersect the slit diaphragm substantially transversely;
    a movable aperture defined by an intersection between the slit diaphragm and the slot diaphragm, said movable aperture having a position which is a function of the angular position of the rotatably mounted member;
    means for focusing a portion of the light reflected from the surface into a region substantially adjacent the rotatable member;
    means for detecting reflected coherent light passing from the surface to the focusing means and through the movable aperture; and
    position sensing means for sensing the position of the movable aperture to measure the entrance angle at which reflected light detected by the detecting means enters the focusing means and thereby to determine the distance.

6. The instrument of claim 5 wherein a plurality of congruent, substantially involutely shaped slit diaphragms are arranged on the rotatably mounted member.

7. The instrument of claim 5 wherein the slit diaphragm is arranged substantially parallel to the incident beam.

* * * * *